(12) United States Patent
Pozzi et al.

(10) Patent No.: US 7,784,862 B2
(45) Date of Patent: Aug. 31, 2010

(54) TRAY TABLE ASSEMBLY

(75) Inventors: Alexander Nicholas Pozzi, Winston-Salem, NC (US); Jadon Clay Gutierrez, Kernersville, NC (US)

(73) Assignee: BE Aerospace, Inc., Wellington, FL (US)

( * ) Notice: Subject to any disclaimer, the term of this patent is extended or adjusted under 35 U.S.C. 154(b) by 73 days.

(21) Appl. No.: 12/207,595

(22) Filed: Sep. 10, 2008

(65) Prior Publication Data
US 2010/0060044 A1 Mar. 11, 2010

(51) Int. Cl.
*A47B 39/00* (2006.01)
(52) U.S. Cl. .................. 297/167; 297/163; 297/165; 297/168; 297/169
(58) Field of Classification Search .................. 297/163, 297/165, 167–169
See application file for complete search history.

(56) References Cited

U.S. PATENT DOCUMENTS

| | | | | |
|---|---|---|---|---|
| 3,596,987 A | * | 8/1971 | Wilson | 297/188.07 |
| 4,141,586 A | * | 2/1979 | Goldner et al. | 297/167 |
| 4,159,071 A | * | 6/1979 | Roca | 297/163 |
| 4,281,874 A | * | 8/1981 | Iwans et al. | 297/163 |
| 4,431,231 A | * | 2/1984 | Elazari et al. | 297/163 |
| 4,511,178 A | * | 4/1985 | Brennan | 297/146 |

\* cited by examiner

*Primary Examiner*—Laurie K Cranmer
(74) *Attorney, Agent, or Firm*—Adams Intellectual Property Law

(57) ABSTRACT

A tray table assembly for a reclinable seat that includes a tray table support arm including a support arm guide member and a slot for receiving a seat frame guide member therein for providing vertically translation of the assembly with seat movement, a support arm guiding member defining a guiding surface and an assembly stowing detent, a tray table pivotably attached to the tray table support arm, and a mechanical stop for limiting rotating of the tray table support arm.

16 Claims, 4 Drawing Sheets

TRAY TABLE ASSEMBLY

TECHNICAL FIELD AND BACKGROUND OF THE INVENTION

1. Field of the Invention

The present invention relates generally to a tray table assembly, and more specifically, to a tray table assembly that follows seat motion without sacrificing tray deployment height and traditional stowing movement.

2. Description of the Related Art

Passenger seats, such as those found on an aircraft, are commonly arranged in multiple rows of predetermined numbers of seats. While luxury class seats and rows of other class seats without a preceding row typically include tray tables that stow and rotate into position as desired from an armrest located alongside the seat, multiple rows of other class seats typically include tray tables that are attached to the seatbacks immediately forward of them. These conventional tray tables include a generally flat supporting surface pivotably connected to a pair of supporting arms that are pivotably connected to a seat frame farther operable for supporting seat back and seat bottom portions. The supporting arms are commonly attached about the sides of the seat frame so as not to interfere with the living space of either passenger, and to support the tray table about each of its ends. To deploy the tray table for use, the passenger typically releases a latching mechanism used to maintain the tray table in an upright, stowed position, and lowers the tray table into a generally horizontal functional position. To stow the tray table, the passenger vertically lifts the tray table rotating it into position up against its respective seat back and actuates the latching mechanism to hold it in position.

Conventional tray tables suffer several disadvantages including: their deployment height is affected by the degree of recline of the seat back to which they are attached; they are difficult to stow and activate the latching mechanism when their respective seat back is in a reclined position; they require the passenger to lift the tray vertically to stow; and, they do not always properly locate themselves into the latched position when the seat back is in a reclined position. Accordingly, it would be desirable to provide a tray table that overcomes these disadvantages.

BRIEF SUMMARY OF THE INVENTION

In one aspect, a tray table is provided of the type that attaches to the rear of a seat frame to service the seat immediately behind the seat to which the tray table attaches.

In another aspect, a tray table is provided that is adapted to be selectively moved between stowed and deployed configurations.

In yet another aspect, a tray table is provided that includes attachment structure for allowing the tray table to follow a cradle seat motion without sacrificing tray deployment height.

In yet another aspect, a tray table is provided including slotted supporting arms to allow the tray table to translate vertically to follow the cradle seat motion.

In yet another aspect, a tray table assembly is provided including guides that are guided along ramp structure and received within detents to lock the tray table assembly into place when stowed, and allow the tray table assembly to follow the seat through upright and reclined positions.

In yet another aspect, a tray table assembly is provided where forward tray rotating movement is converted into lifting motion (vertical translation) without requiring the passenger to vertically lift the tray table.

In yet another aspect, a tray table assembly is provided that locates itself in the latched/stowed position on the seat back regardless of what degree the seat is reclined.

To achieve the foregoing and other aspects and advantages, and in accordance with the purposes of the invention as embodied and broadly described herein, a tray table assembly is provided associated with a reclinable passenger seat. The tray table assembly includes a tray table support arm, and preferably a pair of support arms, defining a first end for attachment with a tray table, a second end including a support arm guide member, and a slot for receiving a seat frame guide member therein and providing a guiding path to allow the tray table support arm to translate vertically with cradle seat movement. The assembly further includes a support arm guiding member defining a surface along which the support arm guide member travels when the tray table assembly is deployed, and a detent for catching and maintaining the support arm guide member when the tray table assembly is stowed. The assembly further includes a tray table pivotably attached to the tray table support arm, the tray table defining a generally planar surface for supporting objects or functioning as a working surface. The assembly further includes a mechanical stop for limiting pivoting or rotation of the tray table support arm to position the tray table in a generally horizontal position when fully deployed. In one embodiment, the mechanical stop is positioned about the seat frame guide member and prevents the tray table from rotating past a horizontal position.

In additional embodiments, the support arm guiding member is attached to the seat frame and travels along with it, and thus is stationary with respect to the pivoting tray table support arm. The support arm guiding member may define a "ramp" surface extending from the detent along which the support arm guide member travels operable for converting forward tray table rotating movement into vertical translation. The support arm guide member may include a roller, post or like guide member capable of traveling along or being guided by the ramp. The support arm guide member is maintained within the detent when the tray table is in the stowed configuration regardless of whether the passenger seat is positioned upright or reclined to any degree. The seat frame guide member is preferably positioned within the slot proximate the first end of the tray table support arm when the passenger seat is reclined, and positioned within the slot proximate the second end of the tray table support arm when the passenger seat is in the upright position.

In another embodiment, a passenger seat assembly is provided including a passenger seat frame and a seat frame guide member, wherein a portion of the passenger seat frame is adapted to selectively pivot between upright and reclined positions. The passenger seat may include seat back and seat bottom portions attached to the frame and allow the seat back portion to selectively recline to any degree. The passenger seat assembly further includes a tray table assembly attached to the passenger seat and including a tray table support arm defining a first end for attachment with a tray table, a second end including a support arm guide member, and a slot for receiving the seat frame guide member therein and providing a guiding path to allow the tray table support arm to translate vertically with seat movement. The tray table assembly further includes a support arm guiding member defining a surface along which the support arm guide member travels when the tray table assembly is deployed, and a detent for catching and maintaining the support arm guide member when the tray table assembly is stowed, a tray table pivotably attached to the tray table support arm, and a mechanical stop for limiting pivoting of the tray table support arm to position the tray table in a generally horizontal position.

The passenger seat of the assembly is preferably of the type in which the tray table support arm, and preferably a pair of support arms, are attached about the sides of the seat back portion so as not to interfere with the living space of either the seat occupant to which the tray table is attached, or the seat occupant to which the tray table services. The tray table assembly is preferably stowed and maintained with a latching mechanism known in the art. A commonly known latching mechanism is typically mounted to the seat back and manually operated to release/lock in place, the tray table portion. The tray table assembly preferably further includes a pair of supporting arms for supporting the tray table about each end to provide adequate support and stability. In alternative embodiments, the tray table assembly may be adjustable as desired to provide maximum passenger comfort and flexibility.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

A tray table assembly is provided and is described with reference for use on an aircraft, such as for a passenger seat of a row of seats of an aircraft passenger cabin. It is intended that the tray table assembly provided herein not be limited to any certain type of vehicle, and thus may be deployed in other vehicles including reclining seats such as, but not limited to, buses, cars, boats, etc. Thus, the tray table assembly may be deployed in any application in which a tray table is attached to one seat and services the seat immediately behind. It is also envisioned that the tray table assembly may be attached to a structure other than a passenger seat, such as a wall, while still maintaining many of the advantages of the design. The tray table portion of the assembly may be made from molded polyethylene or like durable, lightweight materials. The supporting arms and support arm guiding member are preferably made from rigid, lightweight, durable material capable of maintaining its shape and strength through many cycles of use, such as aluminum or like materials. The term "recline" is used throughout the specification and is intended to encompass any degree of recline from about vertical through horizontal positions and beyond.

Figure 1:
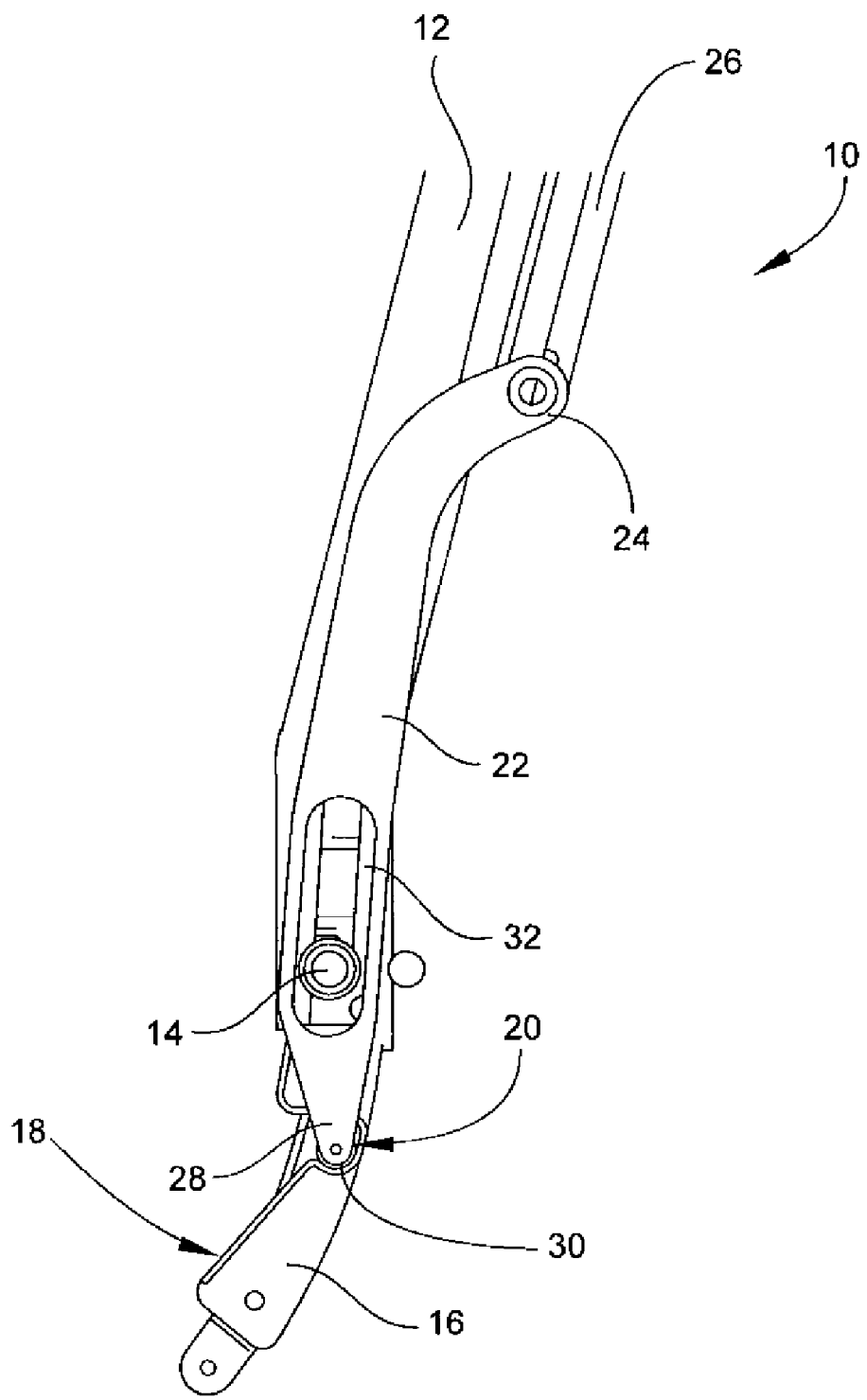
FIG. 1 is a side view of a portion of a seat back and tray table assembly shown with the seat back in an upright position and the tray table assembly in a stowed configuration.

Referring to FIG. 1, a portion of a passenger seat frame including an associated tray table assembly is shown generally at 10. In FIG. 1, the tray table assembly 10 and seat back portion are shown in the stowed and upright positions, respectively. The seat frame includes a seat back portion 12 adapted to selectively recline from an upright position through various degrees. Although not show, the seat frame further typically includes a seat bottom portion and one or more legs for mounting the seat to the aircraft floor. The seat frame optionally includes or more armrests. The degree of recline of the seat back portion 12 is controlled by the seat occupant through a commonly known recline mechanism, such as a depressable button that releases the seat back portion. The seat back portion 12 is typically brought back to the upright position by removing force against the seat back and allowing the seat back portion to return to about vertical. Attached about each side of the seat frame are at least one seat frame guide member 14 which is received within a slot of the tray table support arms, as described in more detail below. The seat frame guide members 14 preferably extend laterally beyond the seat frame to be received within the support arm slot. The seat frame guide members 14 may include posts, rollers or other guide and preferably have a smaller diameter than the width of the slot.

Attached about each side of the seat frame are support arm guiding members 16 that define a surface 18 along which a support arm guide member travels, contacts or is guided when the tray table assembly 10 is deployed. The support arm guiding members 16 further define a detent 20 for catching and maintaining the support arm guide member when the tray table assembly is stowed. In one embodiment, the support arm guiding members define a "ramped" surface extending from the detent 20. The ramps may lock the tray table assembly into following the seat through it's various reclined to upright positions. When the tray table assembly is deployed (i.e., unlatched and lowered) and the seat back portion is in the upright position, the support arm is released from the detent and translates downward with respect to the support arm guiding members 16.

Still referring to FIG. 1, the tray table assembly 10 includes a tray table support arm 22 defining a first end 24 for attachment with a tray table 26, a second end 28 including a support arm guide member 30. The support arm guiding member 30 includes a roller, post or other feature for traveling along surface 18. The support arm 22 further defines an elongated slot 32 positioned about the second end 28 for receiving the seat frame guide member 14 therein and providing a guiding path to allow the tray table support arm to translate vertically with the seat movement. The support arm 22 may be shaped to follow the shape of the seat back portion and bend about the first end 24 to accommodate the tray table. The seat frame guide member 14 is positioned within the slot proximate the second end 28 when the tray table assembly is in the stowed position. The tray table assembly 10 further includes a tray table 26 pivotally attached to the tray table support arm 22. The tray table 26 defines a generally planar working or supporting surface for a meal tray, beverage computer, etc. The tray table 26 pivots with respect to the support arm to a substantially horizontal position, and may include a mechanical stop or limiting pivot point for limiting rotation of the tray table with respect to the support arm.

Figure 2:
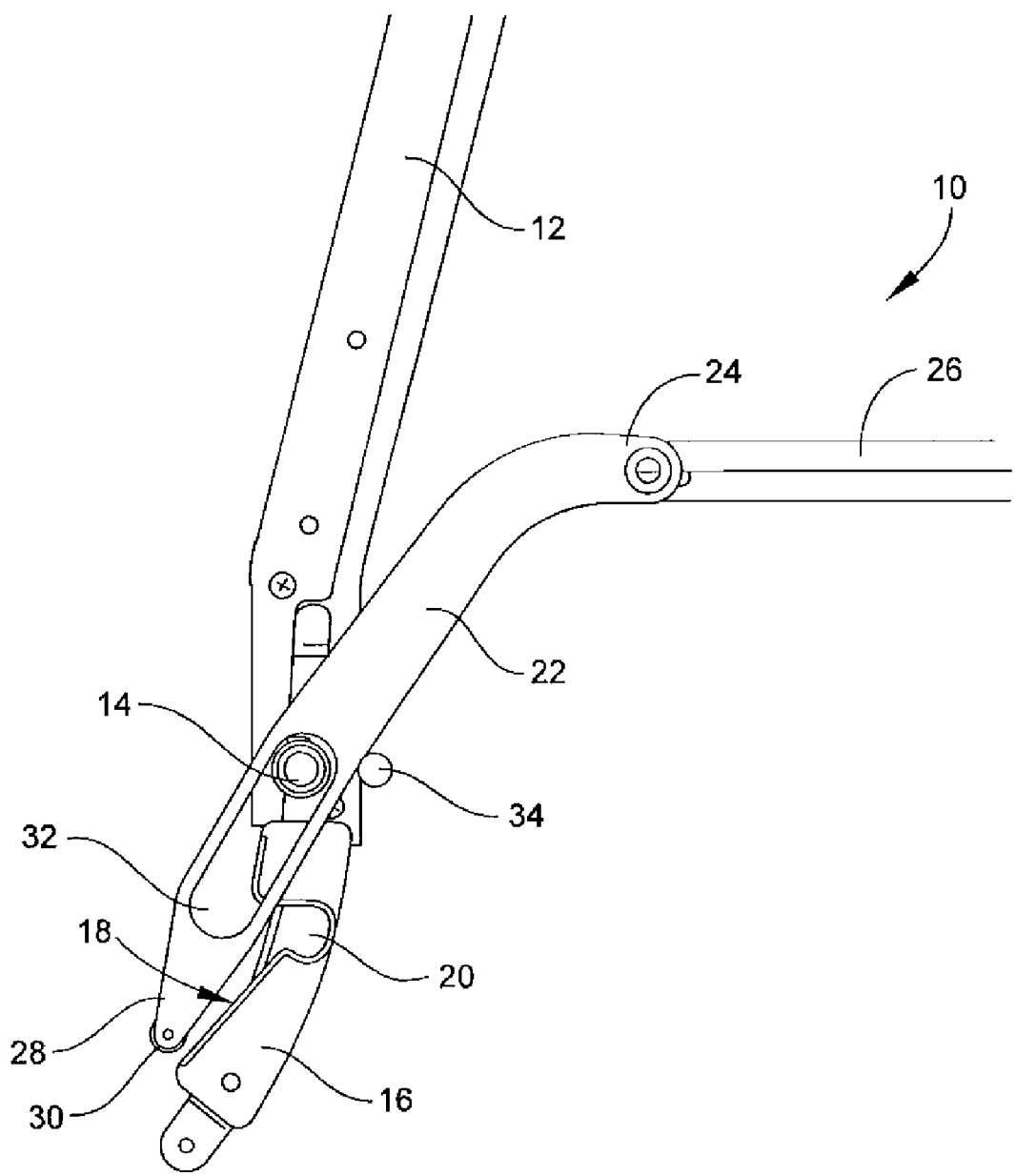
FIG. 2 is a side view of the seat back and tray table assembly of FIG. 1 shown with the seat back in an upright position and the tray table assembly in a deployed configuration.

Referring to FIG. 2, the seat back portion 12 is shown in the upright position and the tray table assembly 10 is shown in the fully deployed position with the tray table 26 positioned substantially horizontal. When deployed, the support arm guide member 30 travels out of the detent 20 and along guiding surface 18. The support arm 22 translates downward with respect to the support arm guiding member 16 and the seat frame guiding member 14 results in the slot proximate the first end 24 of the support arm. When removed from the detent 20, the support arm 22 pivots downward until it encounters a mechanical stop 34. The amount of pivot provided about the guide member 14 and the pivot of the tray table 26 with respect to the support arm 22 provides the substantially horizontal position of the tray table at full deployment.

Figure 3:
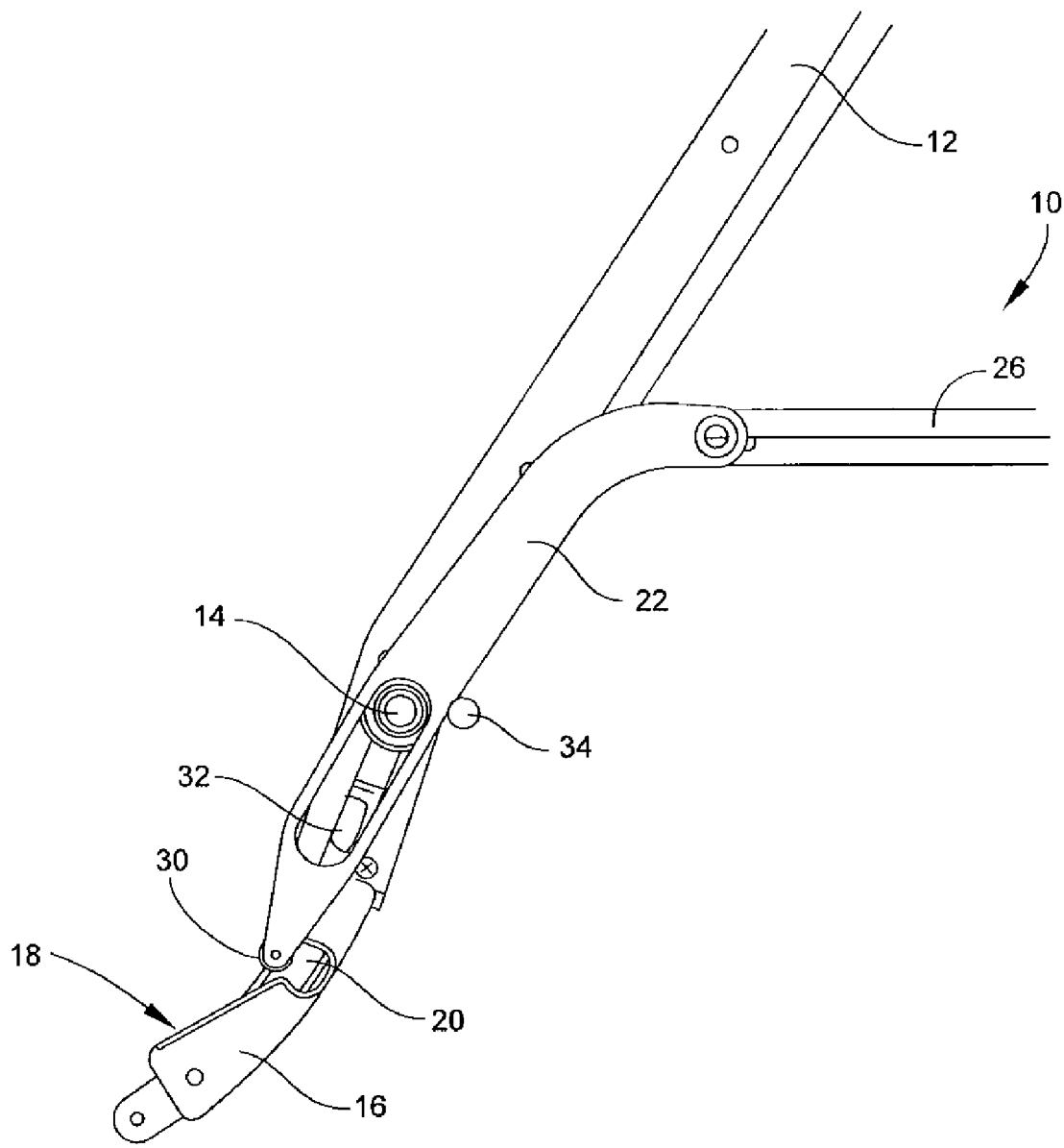
FIG. 3 is a side view of the seat back and tray table assembly of FIG. 1 shown with the seat back in a reclined position and the tray table assembly in a deployed configuration.

Referring to FIG. 3, the seat back portion 12 is shown in a reclined position and the tray table assembly 10 is shown in the fully deployed position with the tray table 26 positioned substantially horizontal. When deployed, the tray table assembly 10 follows the cradle seat movement without sacrificing deployment height, and thus the support arm guide member has moved up the ramp and is positioned closer to the detent 20.

Figure 4:
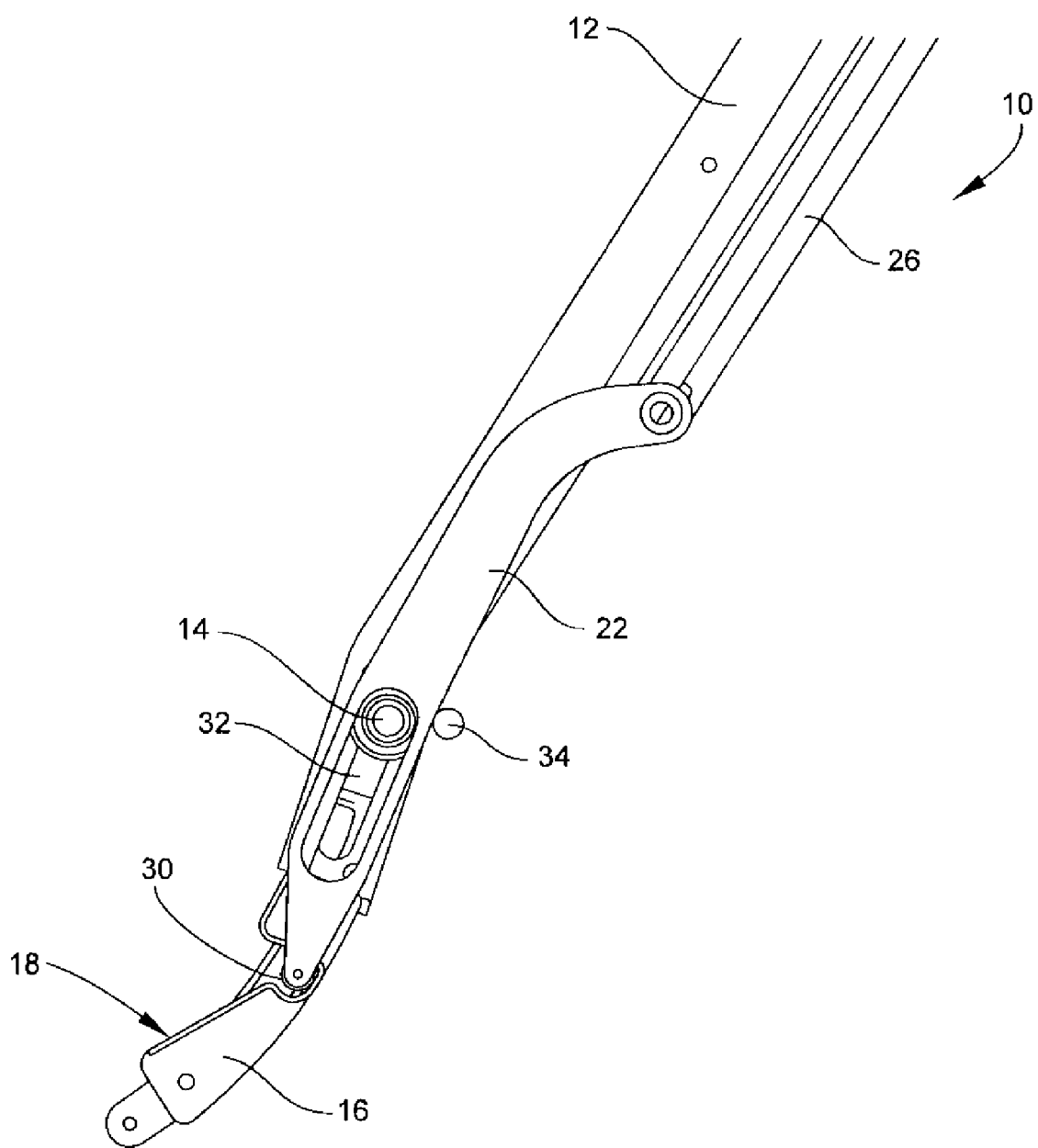
FIG. 4 is a side view of the seat back and tray table assembly of FIG. 1 shown with the seat back in a reclined position and the tray table assembly in a stowed configuration.

Referring to FIG. 4, the seat back portion 12 is shown in the reclined position and the tray table assembly 10 is shown in the stowed configuration with the tray table 26 latched. The support arm guide member 30 is received and maintained within the detent 20. To stow the tray table assembly, the support arm guide member 30 and surface 18 converts forward tray rotating movement into a lifting motion (vertical translation) without requiring the passenger to vertically lift the food tray. Since the support arm 22 follows the surface 18 that moves with the seat back portion 12, when attempting to stow, the tray table assembly 10 properly locates itself to the home/latched position on the seat back regardless of what degree the seat is reclined.

The foregoing is a description of various embodiments of an adjustable, bi-fold tray table that are given here by way of example only. Although the invention has been described with reference to preferred embodiments thereof, other embodiments may perform similar functions and/or achieve similar results. Any and all such equivalent embodiments and examples are within the spirit and scope of the present invention and are intended to be covered by the appended claims.

What is claimed is:

1. A tray table assembly for a reclinable passenger seat, comprising:
   a tray table support arm defining a first end for attachment with a tray table, a second end including a support arm guide member, and a slot for receiving a seat frame guide member therein and providing a guiding path to allow the tray table support arm to translate vertically with seat movement;
   a support arm guiding member defining a surface along which the support arm guide member travels when the tray table assembly is deployed, and a detent for catching and maintaining the support arm guide member when the tray table assembly is stowed;
   a tray table pivotably attached to the tray table support arm; and
   a mechanical stop for limiting pivoting of the tray table support arm to position the tray table in a generally horizontal position.

2. The tray table assembly according to claim 1, wherein the support arm guiding member is attached to a seat frame.

3. The tray table assembly according to claim 1, wherein the support arm guiding member converts forward tray table rotating movement into vertical translation.

4. The tray table assembly according to claim 1, further comprising a pair of tray table support arms for supporting each end of the tray table.

5. The tray table assembly according to claim 1, wherein the support arm guide member is maintained within the detent when the tray table is in the stowed configuration regardless of whether the passenger seat is positioned upright or reclined.

6. The tray table assembly according to claim 1, wherein the seat frame guide member is positioned within the slot proximate the first end of the tray table support arm when the passenger seat is in the reclined position, and positioned within the slot proximate the second end of the tray table support arm when the passenger seat is in the upright position.

7. The tray table assembly according to claim 1, wherein the surface of the support arm guiding member defines a ramp.

8. The tray table assembly according to claim 1, wherein the tray table assembly is adapted to translate vertically to follow passenger seat motion.

9. A passenger seat assembly, comprising:
   a passenger seat comprising a frame portion including a seat frame guide member, the frame portion adapted to selectively pivot between upright and reclined positions; and
   a tray table assembly attached to the passenger seat, the tray table assembly comprising:
      a tray table support arm defining a first end for attachment with a tray table, a second end including a support arm guide member, and a slot for receiving the seat frame guide member therein and providing a guiding path to allow the tray table support arm to translate vertically with seat movement;
      a support arm guiding member defining a surface along which the support arm guide member travels when the tray table assembly is deployed, and a detent for catching and maintaining the support arm guide member when the tray table assembly is stowed;
      the tray table being pivotably attached to the tray table support arm; and
      a mechanical stop for limiting pivoting of the tray table support arm to position the tray table in a generally horizontal position.

10. The passenger seat assembly according to claim 9, wherein the support arm guiding member is attached to the frame portion.

11. The passenger seat assembly according to claim 9, wherein the support arm guiding member converts forward tray table rotating movement into vertical translation.

12. The passenger seat assembly according to claim 9, further comprising a pair of tray table support arms pivotably attached about each end of the tray table.

13. The passenger seat assembly according to claim 9, wherein the support arm guide member is maintained within the detent when the tray table is in the stowed configuration regardless of whether the passenger seat is positioned upright or reclined.

14. The passenger seat assembly according to claim 9, wherein the seat frame guide member is positioned within the slot proximate the first end of the tray table support arm when the passenger seat is in the reclined position, and positioned within the slot proximate the second end of the tray table support arm when the passenger seat is in the upright position.

15. The passenger seat assembly according to claim 9, wherein the surface of the support arm guiding member defines a ramp.

16. The passenger seat assembly according to claim 9, wherein the tray table assembly is adapted to translate vertically to follow passenger seat motion.

* * * * *